United States Patent
Chen (10) Patent No.: US 12,489,357 B2
(45) Date of Patent: Dec. 2, 2025

(54) ISOLATED SWITCHING CONVERTER WITH SOFT SWITCHING AND CONTROL METHOD THEREOF

(71) Applicant: Chengdu Monolithic Power Systems Co., Ltd., Chengdu (CN)

(72) Inventor: Xuefeng Chen, Hangzhou (CN)

(73) Assignee: Chengdu Monolithic Power Systems Co., Ltd., Sichuan (CN)

(*) Notice: Subject to any disclaimer, the term of this patent is extended or adjusted under 35 U.S.C. 154(b) by 223 days.

(21) Appl. No.: 18/351,212

(22) Filed: Jul. 12, 2023

(65) Prior Publication Data
US 2024/0039389 A1 Feb. 1, 2024

(30) Foreign Application Priority Data
Jul. 27, 2022 (CN) .......................... 202210891445.8

(51) Int. Cl.
*H02M 1/00* (2007.01)
*H02M 1/08* (2006.01)
*H02M 3/335* (2006.01)

(52) U.S. Cl.
CPC ....... *H02M 1/0058* (2021.05); *H02M 1/0009* (2021.05); *H02M 1/083* (2013.01); *H02M 3/33523* (2013.01); *H02M 3/33592* (2013.01); *H02M 1/0003* (2021.05)

(58) Field of Classification Search
CPC .. H02M 1/0009; H02M 1/0058; H02M 1/083; H02M 1/0003; H02M 3/33523; H02M 3/33592
See application file for complete search history.

(56) References Cited

U.S. PATENT DOCUMENTS

| | | | |
|---|---|---|---|
| 9,899,931 B1* | 2/2018 | Chang | H02M 3/33592 |
| 10,098,194 B1* | 10/2018 | Xiong | H05B 45/355 |
| 10,840,817 B1* | 11/2020 | Chopra | H02M 3/33592 |
| 2016/0344296 A1* | 11/2016 | Luo | H02M 1/08 |
| 2017/0155335 A1* | 6/2017 | Chang | H02M 1/36 |
| 2021/0119526 A1* | 4/2021 | Chung | H02M 3/33523 |
| 2022/0103078 A1 | 3/2022 | Fan et al. | |
| 2022/0209665 A1 | 6/2022 | Li et al. | |
| 2022/0209676 A1 | 6/2022 | Li et al. | |
| 2022/0393603 A1 | 12/2022 | Chen | |

* cited by examiner

*Primary Examiner* — Jue Zhang
*Assistant Examiner* — Lakaisha Jackson
(74) *Attorney, Agent, or Firm* — Perkins Coie LLP (57) ABSTRACT

A controller used in an isolated switching converter having a transformer, a primary switch and a secondary switch. The controller has an ON-time control circuit. The secondary switch is turned on for a second ON-time after a current flowing through the secondary switch decreases to zero. The ON-time control circuit provides an ON-time control signal to control the second ON-time of the secondary switch based on a drain terminal voltage of the secondary switch, the output voltage of the isolated switching converter and a resistance of an external resistor outside of the controller.

17 Claims, 9 Drawing Sheets

ISOLATED SWITCHING CONVERTER WITH SOFT SWITCHING AND CONTROL METHOD THEREOF

CROSS-REFERENCE TO RELATED APPLICATIONS

This application claims the benefit of CN application 202210891445.8, filed on Jul. 27, 2022, and incorporated herein by reference.

TECHNICAL FIELD OF THE INVENTION

The present invention generally relates to electronic circuits, and more particularly but not exclusively, to isolated switching converters with soft switching and associated control methods.

BACKGROUND OF THE INVENTION

The Universal Serial Bus (USB) Power Delivery (PD) standard has started gaining popularity among smart devices and notebook computer manufacturers. The USB PD standard allows for a higher power level (up to 100 W) and adaptive output voltages (e.g., 5V to 28V), this trend requires higher power, faster and smaller isolated switching power supplies.

However, as silicon-based devices approach their theoretical performance limits, further performance improvements of the existing isolated power supplies have become more difficult to meet the higher power delivery requirements of PD standards while maintaining high efficiency and low cost.

SUMMARY OF THE INVENTION

An embodiment of the present invention discloses a controller used in an isolated switching converter, the isolated switching converter has a transformer having a primary winding and a secondary winding, a primary switch coupled to the primary winding and a secondary switch coupled to the secondary winding. The controller comprises an ON-time control circuit. The On-time control circuit has a first input terminal, a second input terminal, a third input terminal and an output terminal. The first input terminal is coupled a drain terminal of the secondary switch to receive a drain terminal voltage of the secondary switch, the second input terminal is configured to receive an output voltage of the isolated switching converter, the third input terminal is coupled to an external resistor outside of the controller. The secondary switch is turned on for a second ON-time after a current flowing through the secondary switch decreases to zero. The ON-time control circuit provides an ON-time control signal to control the second ON-time of the secondary switch based on the drain terminal voltage of the secondary switch, the output voltage and the resistance of the external resistor.

Another embodiment of the present invention discloses an isolated switching converter. The isolated switching converter comprises a transformer having a primary winding and a secondary winding, a primary switch coupled to the primary winding, a secondary switch coupled to the secondary winding, and a controller. The controller comprises an ON-time control circuit. The On-time control circuit has a first input terminal, a second input terminal, a third input terminal and an output terminal. The first input terminal is coupled a drain terminal of the secondary switch to receive a drain terminal voltage of the secondary switch, the second input terminal is configured to receive an output voltage of the isolated switching converter, the third input terminal is coupled to an external resistor outside of the controller. The secondary switch is turned on for a second ON-time after a current flowing through the secondary switch decreases to zero. The ON-time control circuit provides an ON-time control signal to control the second ON-time of the secondary switch based on the drain terminal voltage of the secondary switch, the output voltage and the resistance of the external resistor.

Yet another embodiment of the present invention discloses a control method used in an isolated switching converter. The switching converter has a transformer having a primary winding and a secondary winding, a primary switch coupled to the primary winding and a secondary switch coupled to the secondary winding. The control method comprises turning on the secondary switch for a second ON-time after a current flowing through the secondary switch decreases to zero; and providing an ON-time control signal to control the second-ON time of the secondary switch based on a drain terminal voltage of the secondary switch, an output voltage of the isolated switching converter and a resistance of an external resistor outside of the controller.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in any isolated switching converter with soft switching. In the following detailed description, for the sake of brevity, only a flyback converter is taken as an example to explain and describe the working principle of the present invention.

Figure 1:
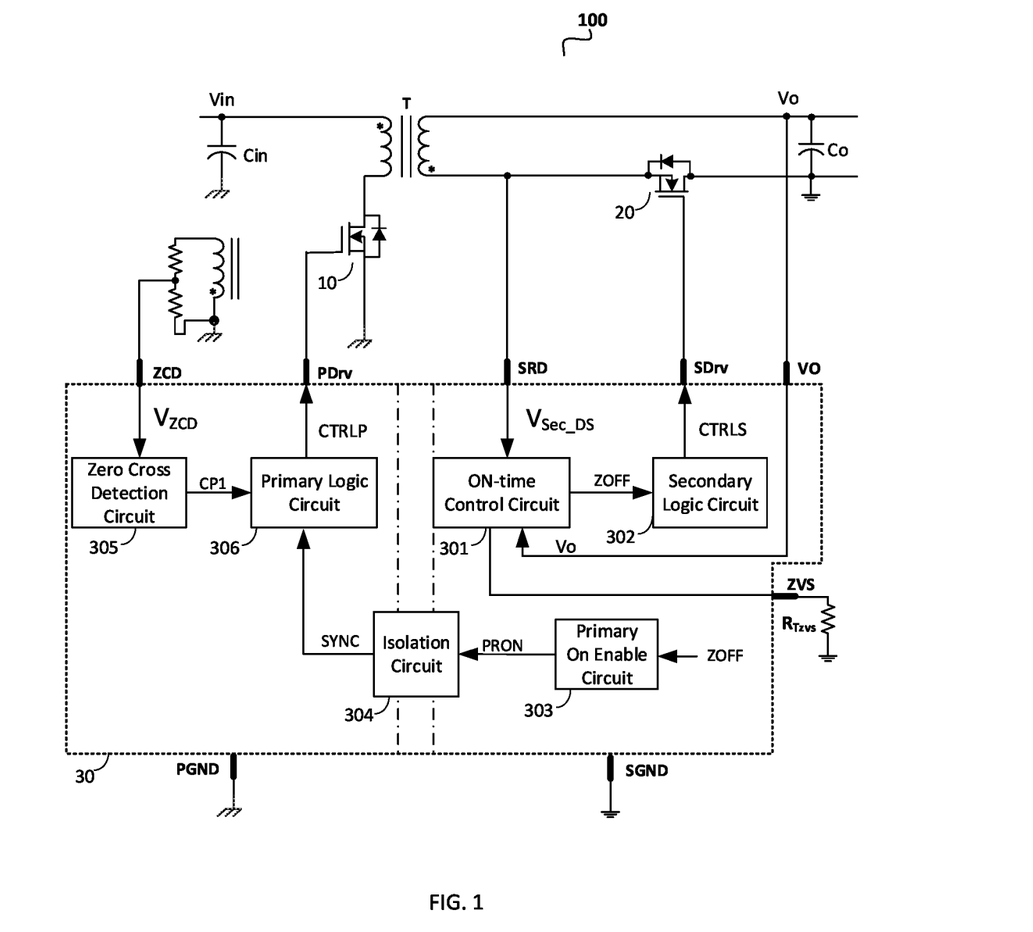
FIG. 1 shows a block diagram of an isolated switching converter 100 in accordance with an embodiment of the present invention.

FIG. 1 shows a block diagram of an isolated switching converter 100 in accordance with an embodiment of the present invention. As shown in FIG. 1, the isolated switching converter 100 comprises a transformer T, a primary switch 10, a secondary switch 20 and a controller 30. The transformer T for providing isolation between a primary side and a secondary side, and has a primary winding, a secondary winding and an auxiliary winding. The primary winding and the secondary winding both have a first terminal and a second terminal. The first terminal of the primary winding receives an input voltage Vin, the first terminal of the secondary winding provides a DC output voltage Vo, and the second terminal of the secondary winding is coupled to a secondary reference Ground (SGND). The primary switch 10 is coupled between the second terminal of the primary winding and a primary reference ground (PGND). The secondary switch 20 is coupled between the second terminal of the secondary winding and a load. However, those skilled in the art should know that the secondary switch 20 may also be coupled between the first terminal of the secondary winding and the load.

The primary switch 10 is coupled to the primary winding, and controls the energy stored in the primary winding to be transferred to the secondary winding. The secondary switch 20 is coupled to the secondary winding, and serves as a synchronous rectifier to replace a traditional rectifier diode, to reduce loss and improve the efficiency of the isolated switching converter 100. In addition, the switching loss may be further reduced by using the parasitic elements of the circuit (e.g., an output capacitance of the primary switch 10 and an excitation inductance of the transformer T) to turn on the primary switch 10 at zero voltage.

In the embodiment shown in FIG. 1, the controller comprises an ON-time control circuit 301, a secondary logic circuit 302, a primary on enable circuit 303, an isolation circuit 304, a zero cross detection circuit 305 and a primary logic circuit 306. In one embodiment, the controller 30 is an integrated circuit chip having a plurality of pins.

In the embodiment shown in FIG. 1, the switching converter 100 operates in a discontinuous conduction mode (DCM), and the primary switch 10 is turned on with zero-voltage turning-on technique. Before the primary switch 10 will be turned on at zero voltage, the secondary switch 20 is turned on twice. In detail, after the primary switch 10 is turned off, the secondary switch 20 is turned on for a first time. When a current flowing through the secondary switch 20 crosses zero, the secondary switch 20 is turned off. Subsequently, the secondary switch 20 will be turned on again for a second ON-time, to generate a negative current flowing through the magnetized inductance of the transformer T. This negative current is used to discharge the output capacitance of the primary switch 10. After the secondary switch 20 is turned off again, the primary switch 10 is turned on and the next switching cycle starts. In the embodiment of the present invention, the second ON-time of the secondary switch 20 can be adjusted in real time, so as to completely discharge the output capacitance of the primary switch 10, and to achieve full zero-voltage switching (Full ZVS) of the primary switch 10.

As shown in FIG. 1, the ON-time control circuit 301 has a first input terminal, a second input terminal, a third input terminal and an output terminal. The first input terminal of the ON-time control circuit 301 is coupled a drain terminal of the secondary switch 20 via a SRD pin to receive a drain terminal voltage $V_{Sec\_DS}$ of the secondary switch 20. The second input terminal of the ON-time control circuit 301 is coupled to a VO pin of the controller 30 and is configured to receive the output voltage Vo of the isolated switching converter 100. The third input terminal of the ON-time control circuit 301 is coupled to a ZVS pin of the controller 30, and the ZVS pin is coupled to an external resistor $R_{TZVS}$ outside of the controller 30. The ON-time control circuit 301 is configured to provide an ON-time control signal ZOFF to control a second ON-time of the secondary switch 20 based on the drain terminal voltage $V_{Sec\_DS}$, the output voltage Vo and the resistance of the external resistor $R_{TZVS}$. The secondary switch 20 is turned on for the second ON-time after a current flowing through the secondary switch 20 decreases to zero. In one embodiment, a current source coupled to receive the output voltage Vo is further coupled to the ZVS pin of the controller 30, and is configured to sink a control current Is to the external resistor $R_{TZVS}$.

Referring still to FIG. 1, the secondary logic circuit 302 is coupled to the ON-time control circuit 301 to receive the ON-time control signal ZOFF, and is configured to generate a secondary control signal CTRLS, which is coupled to a control terminal of the secondary switch 20 through a SDrv pin of the controller 30, to control the turning-on and turning-off of the secondary switch 20.

In the embodiment shown in FIG. 1, the primary on enable circuit 303 is configured to provide a primary on enable signal PRON when the secondary switch 20 is turned off after the second ON-time of the secondary switch 20. The isolation circuit 304 has an input terminal configured to receive the primary on enable signal PRON and an output terminal for outputting a synchronous signal SYNC electrically isolated from the primary on enable signal PRON, so as to achieve electrical isolation between the primary side and the secondary side. The isolation circuit 304 may comprise opto-coupler, transformer, capacitor or any other suitable electrical isolation device. In other embodiments, the isolation circuit 304 may be located outside of the controller 30.

The zero cross detection circuit 305 is configured to detect if a voltage $V_{Pri\_DS}$ across the primary switch 10 crosses zero, and provide a voltage zero-crossing detection signal CP1. In one embodiment, the zero cross detection circuit 305 is coupled to the auxiliary winding of the transformer T, and receives a voltage detection signal $V_{ZCD}$ representative of the voltage $V_{Pri\_DS}$ across the primary switch 10 through a ZCD pin of the controller 30. The zero cross detection circuit 305 compares the voltage detection signal VZCD with a zero-crossing threshold $V_{ZCD\_TH}$ and provides the voltage zero-crossing detection signal CP1 at the output terminal based on the comparison. In one embodiment, the zero-crossing threshold $V_{ZCD\_TH}$ is 20 mV.

The primary logic circuit 306 is coupled to the output terminal of the isolation circuit 304 to receive the synchronous signal SYNC, and is further coupled to the zero cross detection circuit 305 to receive the voltage zero-crossing detection signal CP1, and generates a primary control signal CTRLP. The primary control signal CTRLP is provided to a control terminal of the primary switch 10 via a PDrv pin of the controller 30, to control the primary switch 10. In some embodiments, when the synchronous signal SYNC comes while the voltage $V_{Pri\_DS}$ across the primary switch 10 crossing zero, the primary switch 10 is turned on after a time delay $t_{Delay}$. In a further embodiment, the time delay $t_{Delay}$ is provided by a delay circuit which can be adjusted by a second external resistor outside of the controller 30.

Generally, silicon-based devices (such as MOSFETs) require a large amount of energy to fully discharge their output capacitance to achieve zero-voltage switching due to their large output capacitance. However, in practical applications, the output capacitance of silicon-based device is often not fully discharged in consideration of both the cost and the loss. Therefore, when the zero-voltage switching technology is applied, a partial zero-voltage switching is used, rather than a full zero voltage switching in the silicon-based devices. The voltage across the silicon-based device is often not 0V but 15-25V when the silicon-based device is turned on, the controller 30 achieves ZVS for only a part of its operating range. Such partial zero-voltage turning-on will not only increase the conduction loss, but also the secondary switch 20 will bear high spike voltage, resulting in worse electromagnetic interference.

In one embodiment, the primary switch 10 may include an emerging wide bandgap device, such as a gallium nitride (GaN) or silicon carbide (SiC), instead of a traditional silicon-based device. Wide bandgap devices may operate at higher switching frequencies without deterioration in efficiency and have output capacitances much lower than silicon-based devices, such devices will further reduce the size of isolated switching converters while achieving high efficiency. Furthermore, the ON-time control circuit 301 shown in FIG. 1, to adaptively provide the minimum energy to fully discharge the output capacitor of the primary switch 10 according to the actual operation, to achieve the best performance. In one embodiment, the zero-crossing threshold $V_{ZCD\_TH}$ is tens of millivolts, which is much smaller than the voltage when the silicon-based device is turned on with zero-voltage switching technique.

According to an embodiment of the present invention, the resistance of the external resistor $R_{TZVS}$ can be modified and adjusted as required, the output voltage Vo can be easily and directly detected via the VO pin of the controller 30, and the maximum value of the drain terminal voltage $V_{Sec\_DS}$ of the secondary switch 20 can also be detected through the SRD pin of the controller 30. Accordingly, according to the embodiments, the isolated switching converter 100 may meet the high power density, high switching frequency, high efficiency, and electromagnetic interference standards required by USB PD applications, while maintaining the low cost.

Figure 2:
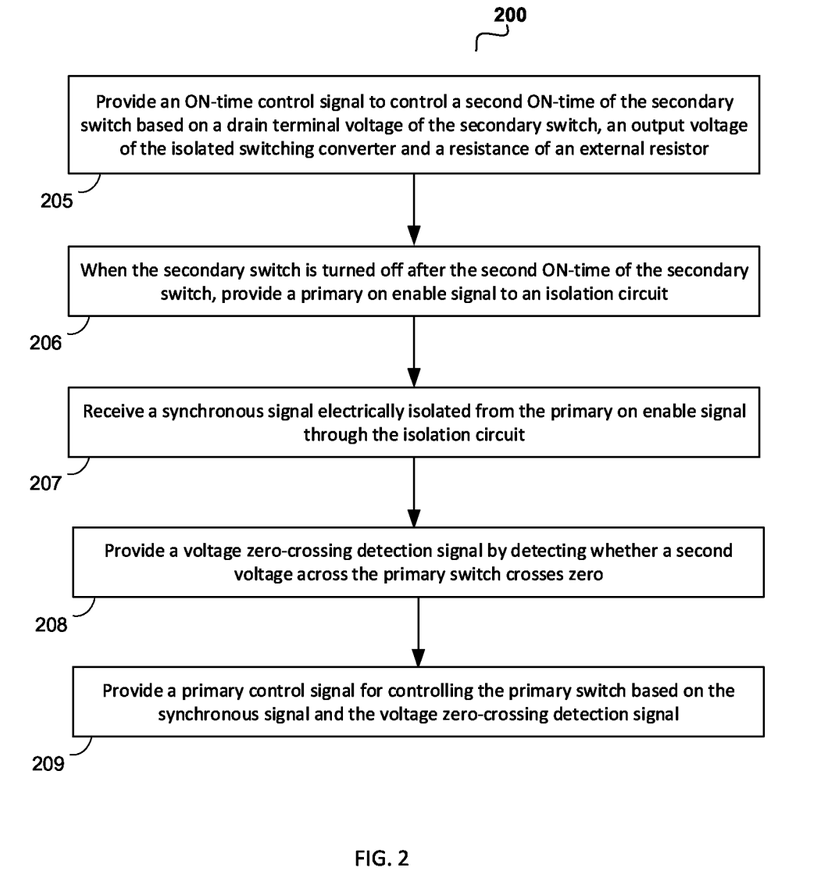
FIG. 2 shows a flow diagram of a control method 200 for the isolated switching converter 100 in accordance with an embodiment of the present invention.

FIG. 2 shows a flow diagram of a control method 200 for the isolated switching converter 100 in accordance with an embodiment of the present invention. The control method comprises steps 205~209.

In step 205, the ON-time control signal is provided to control a second-ON time of the secondary switch, based on the drain terminal voltage of the secondary switch, the output voltage of the isolated switching converter and a resistance of an external resistor.

In step 206, a primary on enable signal is provided to an isolation circuit when the secondary switch is turned off after the second ON-time of the secondary switch.

In step 207, a synchronous signal electrically isolated from the primary on enable signal is received through the isolation circuit.

In step 208, whether the voltage $V_{Pri\_DS}$ across the primary switch 10 crossing zero is detected and a voltage zero-crossing detection signal is provided. In one embodiment, the voltage zero-crossing detection signal is provided by detecting whether the voltage $V_{Pri\_DS}$ across the primary switch 10 is less than the zero-crossing threshold $V_{ZCD\_TH}$.

In step 209, a primary control signal is provided based on the synchronous signal and the voltage zero-crossing detection signal.

In one embodiment, when the synchronous signal comes while the voltage $V_{Pri\_DS}$ across the primary switch 10 crossing zero, the primary switch 10 is turned on after the time delay $t_{Delay}$.

Figure 3:
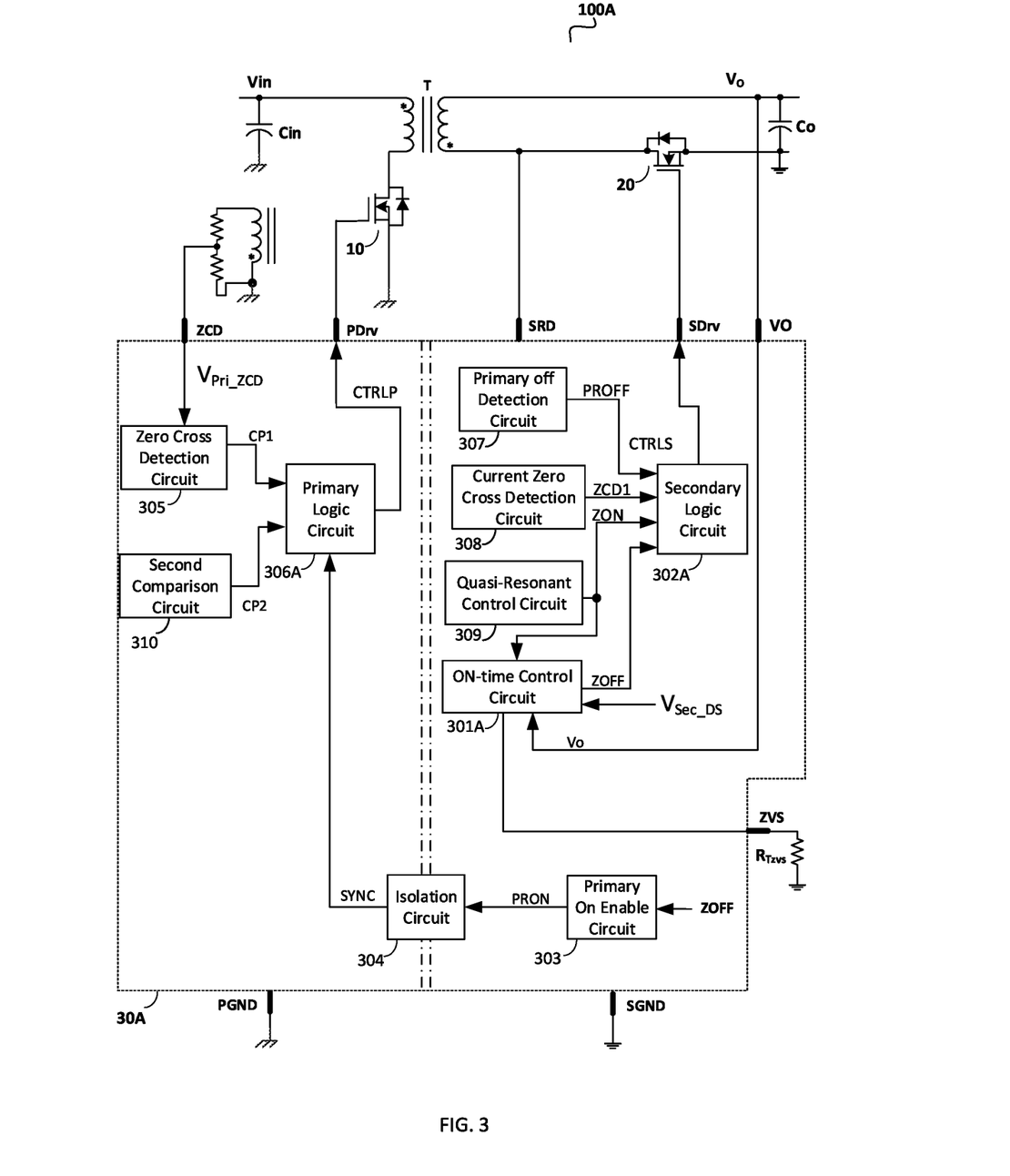
FIG. 3 shows a block diagram of an isolated switching converter 100A in accordance with an embodiment of the present invention.

FIG. 3 shows a block diagram of an isolated switching converter 100A in accordance with an embodiment of the present invention. The controller 30A shown in FIG. 3 is similar with the controller 30 shown in FIG. 1, the difference is that the controller 30A further comprises a primary off detection circuit 307, a current zero cross detection circuit 308 and a quasi-resonant control circuit 309 located at the secondary side, and a second comparison circuit 310 located at the primary side.

In the example shown in FIG. 3, the primary off detection circuit 307 is configured to detect if the primary switch 10 is off and provide a primary off detection signal PROFF. The primary off detection circuit 307 may detect whether the primary switch 10 is off based on the voltage $V_{Sec\_DS}$ across the secondary switch 20, the current flowing though the secondary switch 20 or a voltage across the secondary winding and so on. The primary off detection circuit 307 may also receive signals indicating whether the primary switch 10 is off from the primary side.

The current zero-crossing detection circuit 308 is configured to detect whether the current flowing through the secondary switch 20 crosses zero and generate a zero-crossing detection signal ZCD1. The quasi-resonant control circuit 309 is coupled to the secondary switch 20 and is configured to sense the voltage $V_{Sec\_DS}$ across the secondary switch 20 when the secondary switch 20 is off, and the voltage $V_{Sec\_DS}$ across the secondary switch 20 is a resonant voltage when the secondary switch 20 is off. An on control signal ZON is provided in response to a target locked valley number for turning ON the secondary switch 20. Wherein the target valley locked number is one of a plurality of valleys of the resonant voltage.

It will be understood by those of ordinary skill that the quasi-resonant control is, only an example, the isolated switching converter under discontinuous conduction mode controlled by other control methods also satisfies the spirit and protection scope of the present invention.

As mentioned above, the ON-time control circuit 301A adjusts the second ON-time $T_{ON\_ZVS}$ of the secondary switch 20 based on the voltage $V_{Sec\_SDS}$, the output voltage Vo and the resistance of the external resistor $R_{TZVS}$, and generates the ON-time control signal ZOFF when the on-time of the secondary switch 20 reaches the second ON-time $T_{ON\_ZVS}$.

The secondary logic circuit 302A has a first input terminal, a second input terminal, a third input terminal, a fourth input terminal and an output terminal, wherein the first input terminal is coupled to the primary off detection circuit 307 to receive the primary off detection signal PROFF, the second input terminal is coupled to the output terminal of the current zero cross detection circuit 308 to receive the zero-crossing detection signal ZCD1, the third input terminal is coupled to the quasi-resonant control circuit 309 to receive the ON control signal ZON, the fourth input terminal is coupled to the ON-time control circuit 301A to receive the ON-time control signal ZOFF. The secondary logic circuit 302A generates the secondary control signal CTRLS, based on the primary off detection signal PROFF and the zero-crossing detection signal ZCD1, to control the first switching of the secondary switch 20. In addition, the secondary logic circuit 302A also provides the secondary control signal CTRLS based on the ON control signal ZON and the ON-time control signal ZOFF to control the second switching of the secondary switch 20. When the primary on enable circuit 303 detects that the secondary switch 20 is turned off after the second ON-time $T_{ON\_ZVS}$, it provides the primary on enable signal PRON to the isolation circuit 304.

In addition, the isolated switching converter 100A further comprises the second comparison circuit 310. The second comparison circuit 310 has a first input terminal, a second input terminal and an output terminal, wherein the first input terminal receives a primary current sensing signal ISENP representing the current flowing through the primary switch 10, and the second input terminal receives a first threshold voltage VTH1. The second comparison circuit 310 compares the primary current sensing signal ISENP with the first threshold voltage VTH1, and generates a second comparison signal CP2 at the output terminal. The primary logic circuit 306A is coupled to the output terminal of the second comparison circuit 310 to receive the second comparison signal CP2, and based on the second comparison signal POFF, the voltage zero-crossing detection signal CP1 and the synchronous signal SYNC, to generate the primary control signal CTRLP to control the primary switch 10. When the current sensing signal ISENP reaches the first threshold voltage VTH1, the primary switch 10 is turned off. The first threshold voltage VTH1 may be a constant value, or may dependent on the synchronous signal SYNC.

Figure 4:
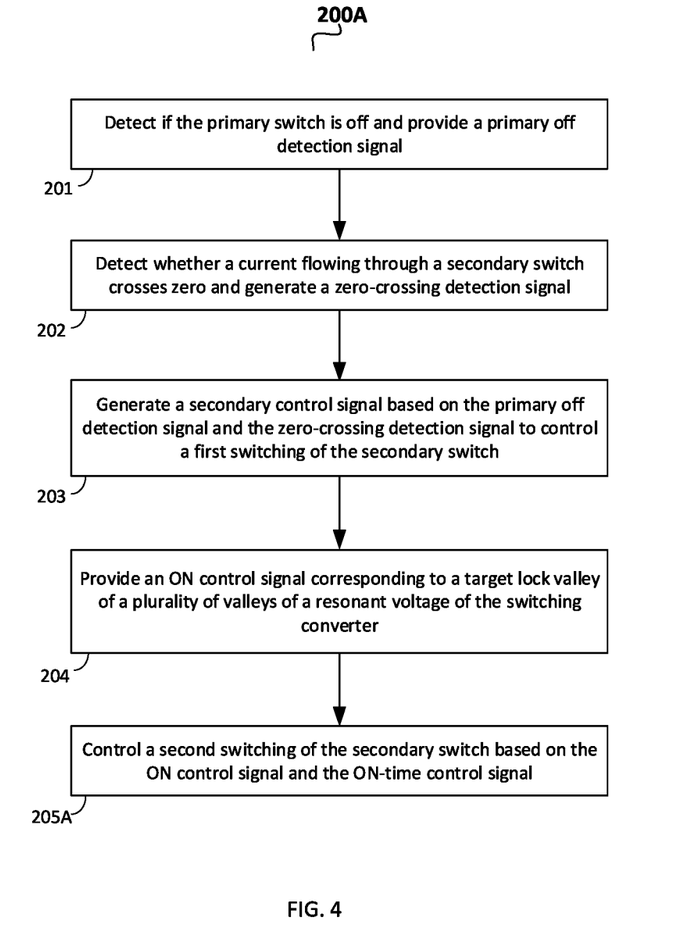
FIG. 4 shows a flow diagram of a control method 200A for the isolated switching converter in accordance with an embodiment of the present invention.

FIG. 4 shows a flow diagram of a control method 200A for the isolated switching converter in accordance with an embodiment of the present invention. In the embodiment shown in FIG. 4, the control method 200A further comprises steps 201~204, except the steps 205~209 shown in FIG. 2.

In detail, in step 201, if the primary switch is off is detected and a primary off detection signal is provided.

In step 202, a zero-crossing detection signal is generated by detecting whether the current flowing through a secondary switch crosses zero.

In step 203, a first switching of the secondary switch is controlled based on the primary off detection signal and the zero-crossing detection signal. The secondary switch is turned on when the primary switch is turned off and is turned off when the current flowing through the secondary switch crosses zero.

Subsequently, in step 204, when the secondary switch 20 is off, the voltage $V_{Sec\_DS}$ across the secondary switch 20 is the resonant voltage, and the ON control signal ZON is generated in response to the target locked valley number of for turning ON the secondary switch 20. In one embodiment, when the resonant voltage across the secondary switch reaches the target locked valley number, the secondary switch 20 is turned on for the second time. Then in step 205A, the ON-time control signal is generated to control the turning-off of the secondary switch. This is to say, the second switching of the secondary switch based on the ON control signal and the ON-time control signal.

Figure 5:
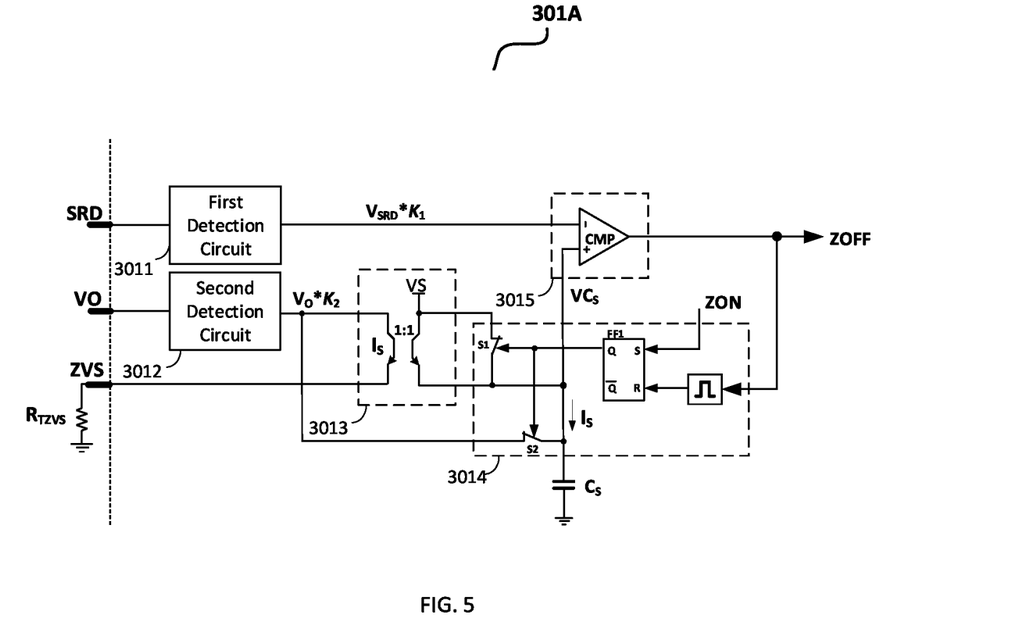
FIG. 5 shows a schematic diagram for the ON-time circuit 301A in accordance with an embodiment of the present invention.

FIG. 5 shows a schematic diagram for the ON-time circuit 301A in accordance with an embodiment of the present invention. In the embodiment shown in FIG. 5, the ON-time control circuit 301A comprises a first detection circuit 3011, a second detection circuit, a capacitor Cs, a current setting unit 3013, a switch control unit 3014 and a comparison circuit 3015. The first detection circuit 3011 is coupled to the drain terminal of the secondary switch 20 via the SRD pin pf the controller 30A, to sense a maximum value $V_{SRD}$ of the drain terminal voltage of the secondary switch 20 and is configured to provide a first voltage signal V1 representative of the maximum value $V_{SRD}$. Wherein the ratio of the first voltage signal V1 and the maximum value $V_{SRD}$ is K1, i.e., $V1=K1*V_{SRD}$. The second detection circuit 3012 has an input terminal and an output terminal, wherein the input terminal is coupled to the VO pin of the controller for receiving the output voltage Vo, the output terminal of the second detection circuit 3012 is configured to provide a second voltage signal V2 representative of the output voltage Vo. Wherein the ratio of the second voltage signal V2 and the output voltage Vo is K2, i.e., $V2=Vo*K2$.

The current setting unit 3013 is coupled to the output terminal of the second detection circuit 3012 and is also coupled to the ZVS pin that connected to the external resistor $R_{TZVS}$. The current setting unit 3013 is configured to set a control current Is based on the second voltage signal V2 and the resistance of the external resistor $R_{TZVS}$. In the embodiment shown in FIG. 5, the current setting unit 3013 comprises a 1:1 current mirror. The control current Is can be determined by the second voltage signal V2 and the resistance of the resistor $R_{TZVS}$, and the current mirror provides the control current Is at its output terminal.

As shown in FIG. 5, the capacitor Cs has a first terminal and a second terminal, wherein the first terminal is coupled to the output terminal of the current setting unit 3013 for receiving the control current Is, the second terminal is coupled to the secondary reference ground. In the embodiment shown in FIG. 5, the switch control unit 3014 comprises switches S1 and S2, a flip-flop FF1. The switches S1 and S2 are normally-off switches. The switch S1 is coupled in parallel with the current setting unit 3013. And is coupled between a power supply VS and the first terminal of the capacitor Cs. The switch S2 is coupled to the output terminal of the second detection circuit 3012 and the first terminal of the capacitor Cs. The flip-flop FF1 has a setting terminal, a resetting terminal and an output terminal, wherein the setting terminal is configured to receive the on control signal ZON, the resetting terminal is configured to receive the ON-time control signal ZOFF through a one-shot circuit, and the flip-flop FF1 provides a control signal to the switches S1 and S2.

The comparison circuit 3015 comprises a comparator CMP. The non-inverting input terminal of the comparator CMP is coupled to the first terminal of the capacitor Cs for receiving the voltage VCs across the capacitor Cs, the inverting input terminal is coupled to the first detection circuit 3011 to receive the first voltage signal V1, the output terminal is configured to provide the ON-time control signal ZOFF.

As shown in FIG. 5, when the ON control signal ZON is changed from a low level to a high level, the secondary switch 20 is turned on for the second time, the voltage VCs across the capacitor Cs is increased from the second voltage signal V2. When the voltage VCs across the capacitor Cs reaches the first voltage signal V1, the output of the comparison circuit 3015 is reversed, the ON-time control signal ZOFF at the output terminal changes from low level to high level, and the secondary switch 20 is turned off for the second time. Then the voltage VCs across the capacitor Cs is reset to the second voltage signal V2. In one embodiment, the ON-time control circuit 301A further comprises a voltage follower. The voltage follower is further coupled between the output terminal of the second detection circuit 3012 and the switch S2, to achieve anti-interference of the signal.

According to the embodiment shown in FIG. 5, the second ON-time $T_{ON\_ZVS}$ of the secondary switch 20 may be given by the following equations:

$$(K_2 V_{SRD} - K_1 V_O) C_S = I_S T_{ON\_ZVS} = \frac{K_1 V_O}{R_{TZVS}} T_{ON\_ZVS} \quad (1)$$

$$\Rightarrow T_{ON\_ZVS} = \frac{C_S R_{TZVS}}{K_1 V_O}(K_2 V_{SRD} - K_1 V_O)$$

$$\Rightarrow T_{ON\_ZVS} = \frac{C_S R_{TZVS}}{K} \frac{(V_{SRD} - K V_O)}{V_O} \left(K = \frac{K_1}{K_2}\right)$$

It can be seen from the above equation (1), the second ON-time $T_{ON\_ZVS}$ can be changed by changing the resistance of the external resistor $R_{TZVS}$. At the same time, the second ON-time $T_{ON\_ZVS}$ adaptively varies with the output voltage Vo and the maximum value $V_{SRD}$, so that the isolated switching converter 100A can be adapted to a wide range of input voltage and output voltage, and provides the minimum energy that can achieve complete zero-voltage turning-on. In one embodiment, K in the equation (1) is a value greater than 1 and less than 2.

Those skilled in the art should know that the second ON-time $T_{ON\_ZVS}$ can also be obtained by adopting other circuit designs with the same function. The benefit of the embodiment shown in FIG. 5 is that in actual mass production, the accuracy of the second ON-time $T_{ON\_ZVS}$ mainly depends on the change of the capacitor Cs. In other words, according to the embodiments of the present invention, only by controlling the precision of the capacitor Cs, the second ON-time $T_{ON\_ZVS}$ can be well controlled during mass production.

Figure 6:
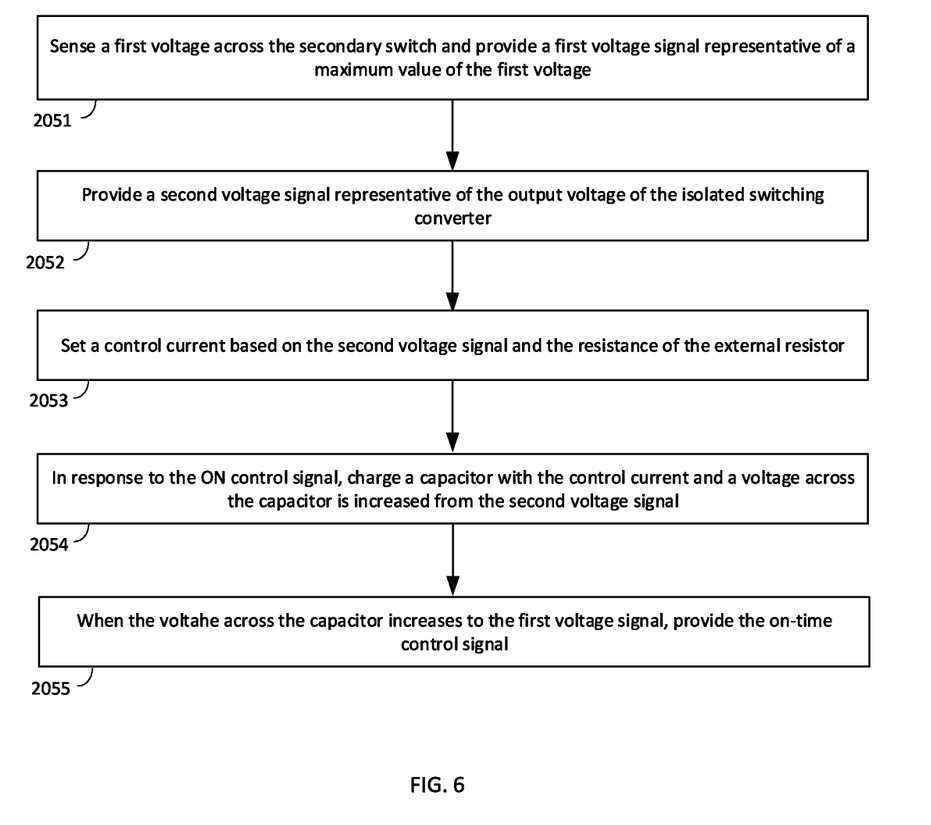
FIG. 6 shows a flow diagram of the step 205 for providing the ON-time control signal in accordance with an embodiment of the present invention.

FIG. 6 shows a flow diagram of the step 205 for providing the ON-time control signal in accordance with an embodiment of the present invention. In the embodiment shown in FIG. 6, the step 205 further comprises steps 2051~2055.

In step 2051, a maximum value of the drain terminal voltage of the secondary switch is sampled and held, and a first voltage signal representative of the maximum value is provided. In one embodiment, the first voltage signal is proportional to the maximum value of the drain terminal voltage.

In step 2052, a second voltage signal representative of the output voltage is provided. In one embodiment, the second voltage signal is proportional to the output voltage.

In step 2053, a control current is set based on the second voltage signal and the resistance of the external resistor.

In step 2054, in response the ON control signal for turning on the secondary switch for the secondary switch, a capacitor is charged with the control current, accordingly, the voltage across the capacitor is increased from the second voltage signal.

In step 2055, when the voltage across the capacitor is increased to reach the first voltage signal, the ON-time control signal is provided, and the charging to the capacitor is stopped. Then the voltage across the capacitor is reset to be the second voltage signal.

Figure 7:
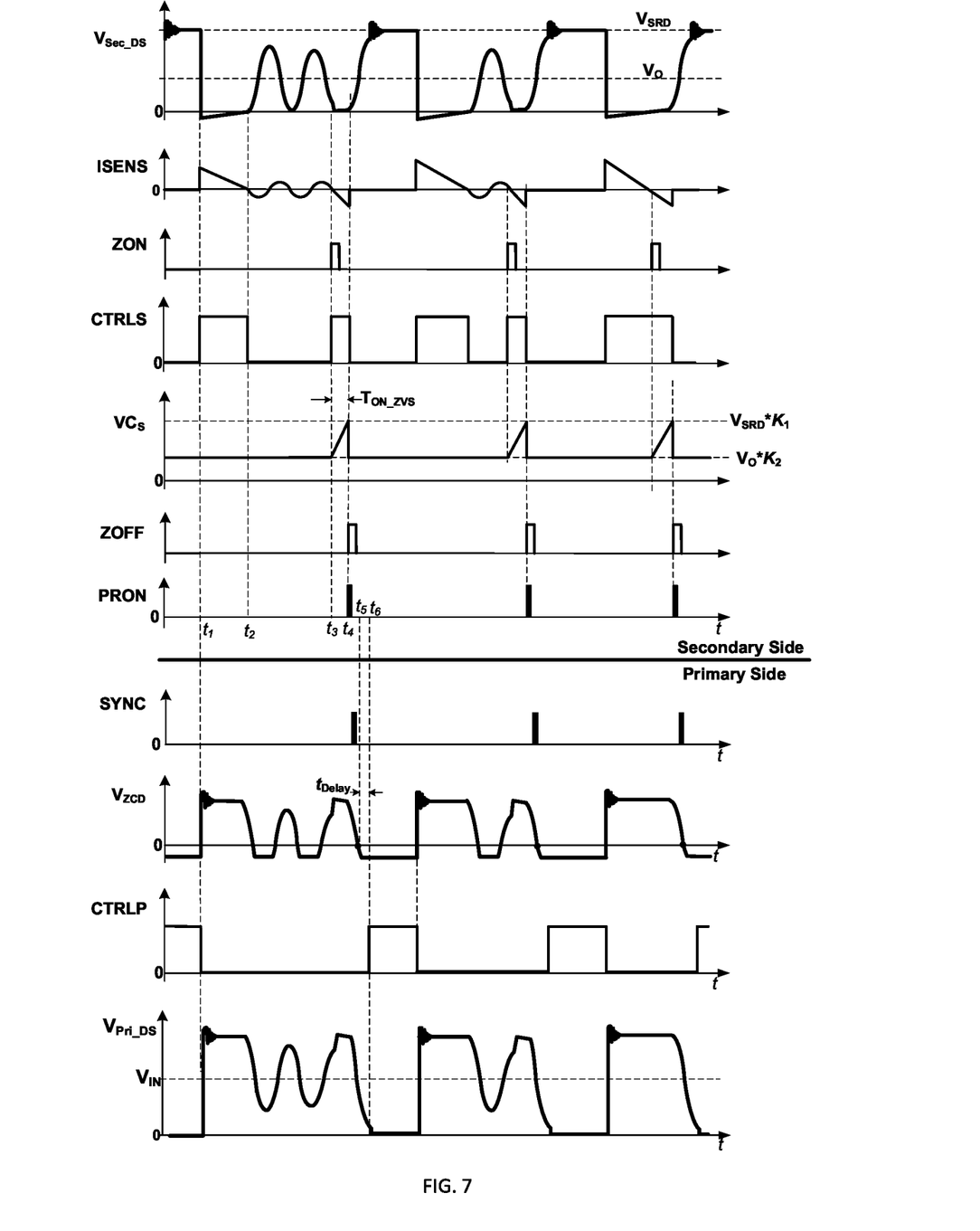
FIG. 7 shows a working waveform diagram of the isolated switching converter 100A in accordance with an embodiment of the present invention.

FIG. 7 shows a working waveform diagram of the isolated switching converter 100A in accordance with an embodiment of the present invention. As shown in FIG. 7, in a switching cycle, for example, at time t1, the primary control signal CTRLP is changed from high level to low level, the primary switch 10 is turned off. After the primary switch 10 is turned off, the voltage $V_{Sec\_DS}$ across the secondary switch 20 is changed from positive to negative, and thus the secondary control signal CTRLS changes from low level to high level, the secondary switch 20 is turned on for a first time.

After that, at time t2, when the current ISENS flowing through the secondary switch 20 decreases to cross zero, the secondary control signal CTRLS changes from high level to low level, the secondary switch 20 is turned off accordingly. The first conduction of the secondary switch 20 finishes.

Subsequently, when the currents flowing through the primary side and the secondary side are both zero, the energy storage element and the parasitic capacitance of the switch begin to resonate to generate a resonant voltage whose waveform can be detected by the quasi-resonant circuit 309 located on the secondary side. At time t3, due to the quasi-resonant control, the voltage $V_{Sec\_DS}$ across the secondary switch 20 is detected, when the resonant voltage reaches the target locked valley number (e.g., a third valley) in the current switching cycle, the ON control signal ZON changes from low level to high level, and the secondary control signal CTRLS also becomes high, and the secondary switch 20 is turned on for a second time.

At the same time, the ON-time control circuit 301A starts to work, the capacitor Cs is charged and thus the voltage VCs across the capacitor Cs is increased from the second voltage signal V2 (i.e., K2*Vo).

At time t4, the voltage VCs across the capacitor Cs is increased to the first voltage signal V1 (i.e., $K1*V_{SRD}$), the ON-time control signal ZOFF changes from low level to the high level, the secondary control signal CTRLS changes from high level to low level, the secondary switch 20 is turned off again. The second conduction of the secondary switch 20 finishes.

In addition, the primary on enable circuit 303 detects the second turning-off of the secondary switch 20 after the second ON-time $T_{ON\_ZVS}$, and provides a primary on enable signal PRON. When a rising edge of the primary on enable signal PRON comes, almost at the same time, the synchronous signal SYNC outputted by the isolation circuit 304 also changes from low level to high level. Then at time t5, when the zero cross detection circuit 305 detects if the voltage $V_{ZCD}$ across the auxiliary winding crosses zero, the primary switch 10 is turned on after a delay time $t_{Delay}$ in response to the voltage $V_{ZCD}$ crossing zero.

As shown in FIG. 7, the voltage $V_{Pri\_DS}$ across the primary switch 10 at the instant of turning-on is so small that zero-voltage turn-on close to the theoretical limit can be achieved.

When the current sensing signal ISENP reaches the first threshold voltage VTH1, the primary switch 10 is turned off. After the primary switch 10 is turned off, the drain terminal voltage $V_{Sec\_DS}$ of the secondary switch 20 changes negative from positive, the secondary switch 20 is turned on.

The above steps are repeated continuously, and the second ON-time $T_{ON\_ZVS}$ of the secondary switch 20 is adjusted in real time, so that the primary switch 10 can be turned on at zero voltage.

Figure 8:
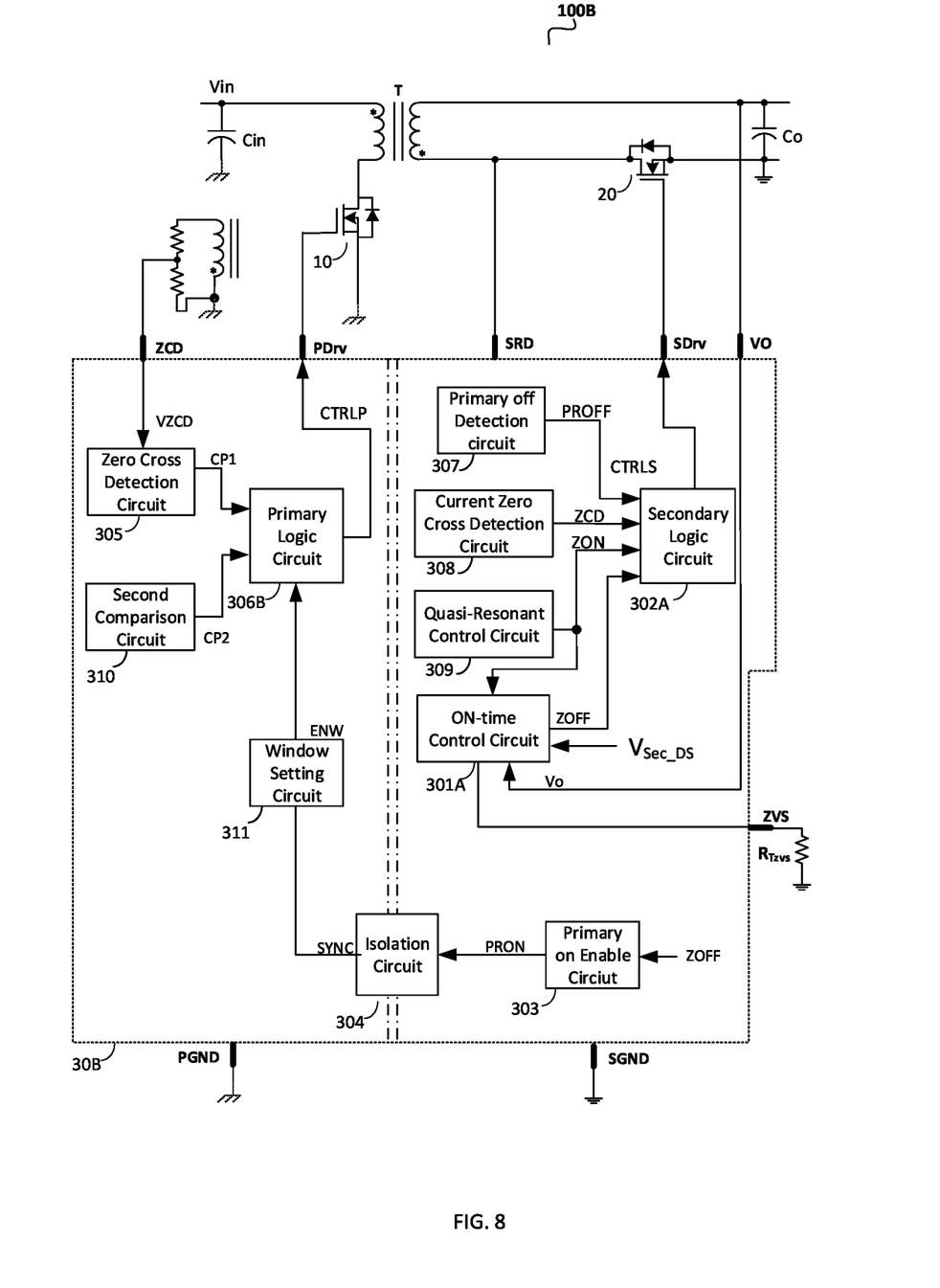
FIG. 8 shows a block diagram of an isolated switching converter 100B in accordance with an embodiment of the present invention.

FIG. 8 shows a block diagram of an isolated switching converter 100B in accordance with an embodiment of the present invention. Compared to the isolation converter 100A shown in FIG. 3, the isolated switching converter 100B of FIG. 8 further comprises a window setting circuit 311. The window setting circuit 311 is coupled between the output terminal of the isolation circuit 304 and the primary logic circuit 306B. The window setting circuit 311 has an input terminal and an output terminal, and wherein the input terminal is coupled to the output terminal of the isolation circuit 304 to receive the synchronous signal SYNC. Based on the synchronous signal SYNC, the window setting circuit 311 establishes an observation window, and provides a window enable signal ENW with the observation window at the output terminal. The primary logic circuit 306B generates the primary control signal CTRLP based on the observation window, the voltage zero-crossing detection signal CP1 and the second comparison signal CP2.

The observation window begins when the synchronous signal SYNC comes. The observation window has a length equal to a fraction of the switching cycle, such as 5% to 15% of the switching cycle. The time delay $t_{Delay}$ is inserted before the turning-on of the primary switch 10 and after an instant of the voltage $V_{Pri\_DS}$ crossing zero. The time delay $t_{Delay}$ is always greater than the time delay $t_{Delay}$. In one embodiment, if the end point of the time delay $t_{Delay}$ is within the observation window, the primary switch 10 is turned on at the end point of the time delay $t_{Delay}$. In another embodiment, the primary switch 10 is turned on at the end point of the observation window if the end point of the time delay $t_{Delay}$ is outside the observation window.

Figure 9:
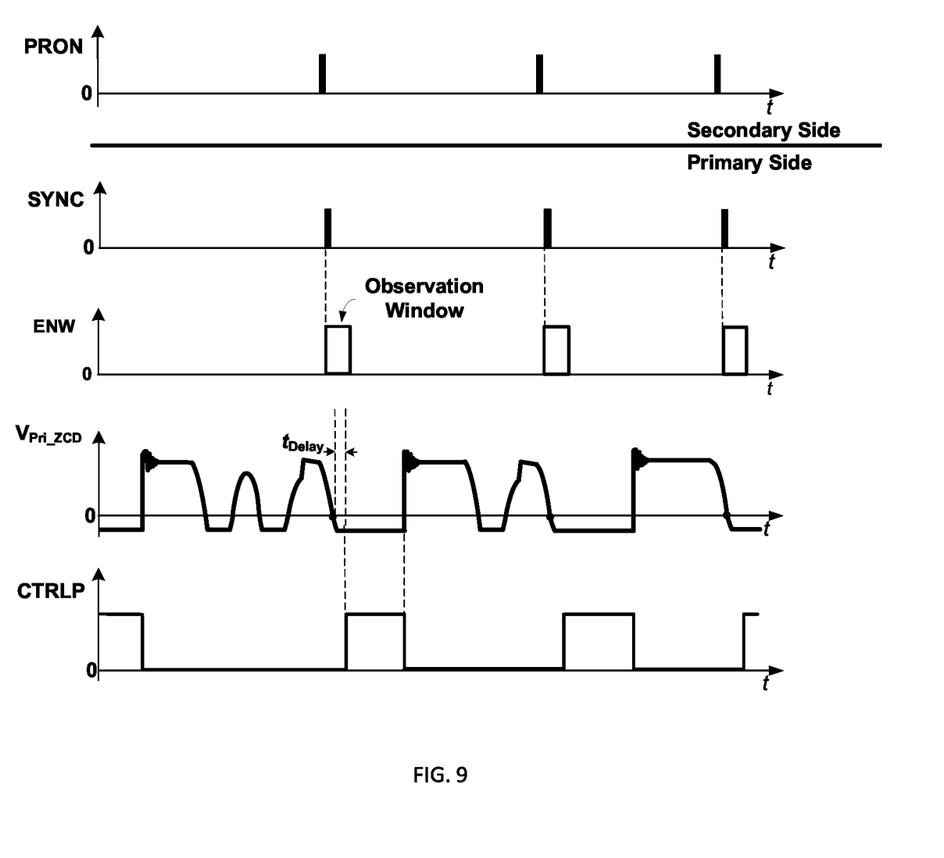
FIG. 9 shows a working waveform diagram of the isolated switching converter 100B in accordance with an embodiment of the present invention.

FIG. 9 shows a working waveform diagram of the isolated switching converter 100B in accordance with an embodiment of the present invention. As shown in FIG. 9, when the rising edge of the synchronous signal SYNC comes, the window enable signal ENW having the observation window is provided and the observation window begins. In observation window, after an instant of the second voltage across the primary switch crossing zero, the time delay $t_{Delay}$ is inserted. Since the end point of the time delay is within the observation window, the primary switch 10 is turned on after the delay time $t_{Delay}$. In other embodiments, the primary switch 10 is turned on at the end point of the observation window.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in an isolated switching converter, the controller comprising:
    an ON-time control circuit having a first input terminal, a second input terminal, a third input terminal and an output terminal, wherein the first input terminal is coupled a drain terminal of a secondary switch to receive a drain terminal voltage of the secondary switch, the second input terminal is configured to receive an output voltage of the isolated switching converter, the third input terminal is coupled to an external resistor outside of the controller, and wherein the secondary switch is turned on for a second ON-time after a current flowing through the secondary switch decreases to zero, and the ON-time control circuit provides an ON-time control signal to control the second ON-time of the secondary switch based on the drain terminal voltage of the secondary switch, the output voltage and the resistance of the external resistor;
    a primary on enable circuit configured to provide a primary on enable signal when the secondary switch is turned off after the second ON-time of the secondary switch;
    an isolation circuit having an input terminal configured to receive the primary on enable signal and an output terminal for outputting a synchronous signal electrically isolated from the primary on enable signal;
    a zero cross detection circuit configured to provide a voltage zero-crossing detection signal by detecting whether a second voltage across a primary switch crosses zero; and
    a primary logic circuit configured to provide a primary control signal for controlling the primary switch based on the synchronous signal and the voltage zero-crossing detection signal.

2. The controller of claim 1, further comprising:
    a primary off detection circuit configured to detect if the primary switch is off and provide a primary off detection signal;
    a current zero cross detection circuit configured to provide a zero-crossing detection signal by detecting whether the current flowing through the secondary switch crosses zero;

a quasi-resonant control circuit coupled to the secondary switch and configured to provide an ON control signal corresponding to a target locked valley of a plurality of valleys of a resonant voltage of the isolated switching converter; and a secondary logic circuit configured to provide a secondary control signal for controlling a first switching of the secondary switch based on the primary off detection signal and the zero-crossing signal, and the secondary control signal is also configured to control a second switching of the secondary switch based on the ON control signal and the ON-time control signal.

3. The controller of claim 1, wherein the ON-time control circuit comprising:

a first detection circuit coupled to the secondary switch to sense a first voltage across the secondary switch and configured to provide a first voltage signal representative of a maximum value of the first voltage, and wherein the ratio of the first voltage signal and the first voltage is a first ratio;

a second detection circuit having an output terminal for providing a second voltage signal representative of the output voltage, and wherein the ratio of the second voltage signal and the output voltage is a second ratio;

a current setting unit coupled to the output terminal of the second detection circuit and the external resistor, and configured to set a control current based on the second voltage signal and the resistance of the external resistor; and a capacitor alternatively connected to the current setting unit and the output terminal of the second detection circuit to thereby alternatingly charge and discharge the capacitor, when a voltage across the capacitor is increased to the first voltage signal from the second voltage signal, the ON-time control signal is provided.

4. The controller of claim 3, wherein the second ON-time is given by:

$$T_{ON\_ZVS} = \frac{C_S R_{TZVS}}{K} \frac{(V_{SRD} - KV_O)}{V_O}$$

wherein $C_s$ is the capacitance of the capacitor, $R_{TZVS}$ is the resistance of the external resistor, $V_{SRD}$ is the maximum value of the first voltage, Vo is the output voltage, and K is the ratio of the second ratio and the first ratio.

5. The controller of claim 1, further comprising:

an observation window setting circuit configured to receive the synchronous signal and to provide an observation window based on the synchronous signal;

a second comparison circuit configured to compare a primary current sensing signal representative of a current flowing through the primary switch with a first threshold voltage, and to provide a second comparison signal; and wherein the primary logic circuit provides the primary control signal based on the observation window, the voltage zero-crossing detection signal and the second comparison signal.

6. The controller of claim 1, wherein at least one of the primary switch and the secondary switch comprises a GaN switch or a SiC switch.

7. An isolated switching converter, comprising:

a transformer having a primary winding and a secondary winding;

a primary switch coupled to the primary winding;

a secondary switch coupled to the secondary winding; and a controller, comprising:

an ON-time control circuit having a first input terminal, a second input terminal, a third input terminal and an output terminal, wherein the first input terminal is coupled a drain terminal of the secondary switch to receive a drain terminal voltage of the secondary switch, the second input terminal is configured to receive an output voltage of the isolated switching converter, the third input terminal is coupled to an external resistor outside of the controller, and wherein the secondary switch is turned on for a second ON-time after a current flowing through the secondary switch decreases to zero, and the ON-time control circuit provides an ON-time control signal to control the second ON-time of the secondary switch based on the drain terminal voltage of the secondary switch, the output voltage and the resistance of the external resistor;

a primary on enable circuit configured to provide a primary on enable signal when the secondary switch is turned off after the second on-time of the secondary switch;

an isolation circuit having an input terminal configured to receive the primary on enable signal and an output terminal for outputting a synchronous signal electrically isolated from the primary on enable signal;

a zero cross detection circuit configured to provide a voltage zero-crossing detection signal by detecting whether a second voltage across a primary switch crosses zero; and a primary logic circuit configured to provide a primary control signal for controlling the primary switch based on the synchronous signal and the voltage zero-crossing detection signal.

8. The isolated switching converter of claim 7, further comprises:

a primary off detection circuit configured to detect if the primary switch is off and provide a primary off detection signal;

a current zero cross detection circuit configured to provide a zero-crossing detection signal by detecting whether the current flowing through the secondary switch crosses zero;

a quasi-resonant control circuit coupled to the secondary switch and configured to provide an ON control signal corresponding to a target locked valley of a plurality of valleys of a resonant voltage of the isolated switching converter; and a secondary logic circuit configured to provide a secondary control signal for controlling a first switching of the secondary switch based on the primary off detection signal and the zero-crossing signal, and the secondary control signal is also configured to control a second switching of the secondary switch based on the ON control signal and the ON-time control signal.

9. The isolated switching converter of claim 7, wherein the ON-time control circuit comprising:

a first detection circuit coupled to the secondary switch to sense a first voltage across the secondary switch and configured to provide a first voltage signal representative of a maximum value of the first voltage, and wherein the ratio of the first voltage signal and the first voltage is a first ratio;

a second detection circuit having an output terminal for providing a second voltage signal representative of the output voltage, and wherein the ratio of the second voltage signal and the output voltage is a second ratio;

a current setting unit coupled to the output terminal of the second detection circuit and the external resistor, and configured to set a control current based on the second voltage signal and the resistance of the external resistor; and a capacitor alternatively connected to the current setting unit and the output terminal of the second detection circuit to thereby alternatingly charge and discharge the capacitor, when a voltage across the capacitor is increased to the first voltage signal from the second voltage signal, the ON-time control signal is provided.

10. The isolated switching converter of claim 9, wherein the second ON-time is given by:

$$T_{ON\_ZVS} = \frac{C_S R_{TZVS}}{K} \frac{(V_{SRD} - KV_O)}{V_O}$$

wherein $C_s$ is the capacitance of the capacitor, $R_{TZVS}$ is the resistance of the external resistor, $V_{SRD}$ is the maximum value of the first voltage, Vo is the output voltage, and K is the ratio of the second ratio and the first ratio.

11. The isolated switching converter of claim 10, the ratio K is less than 2 and higher than 1.

12. The isolated switching converter of claim 7, wherein the controller further comprising:
an observation window setting circuit configured to receive the synchronous signal and to provide an observation window based on the synchronous signal;
a second comparison circuit configured to compare a primary current sensing signal representative of a current flowing through the primary switch with a first threshold voltage, and to provide a second comparison signal; and
wherein the primary logic circuit provides the primary control signal based on the observation window, the voltage zero-crossing detection signal and the second comparison signal.

13. A control method used in an isolated switching converter, the control method comprising:
turning on a secondary switch for a second ON-time after a current flowing through the secondary switch decreases to zero;
providing an ON-time control signal to control the second-ON time of the secondary switch based on a drain terminal voltage of the secondary switch, an output voltage of the isolated switching converter and a resistance of an external resistor outside of a controller;
providing a primary on enable signal to an isolation circuit when the secondary switch is turned off after the second ON-time of the secondary switch;
receiving a synchronous signal electrically isolated from the primary on enable signal through the isolation circuit; and
providing a primary control signal for controlling a primary switch based on the synchronous signal and a voltage zero-crossing detection signal indicating whether a second voltage across the primary switch crosses zero.

14. The control method of claim 13, further comprising:
detecting if the primary switch is off and providing a primary off detection signal;
providing a zero-crossing detection signal by detecting whether the current flowing through the secondary switch crosses zero;
controlling a first switching of the secondary switch based on the primary off detection signal and the zero-crossing signal;
providing an ON control signal corresponding to a target locked valley of a plurality of valleys of a resonant voltage of the isolated switching converter; and
controlling a second switching of the secondary switch based on the ON control signal and the ON-time control signal.

15. The control method of claim 14, wherein providing the ON-time control signal comprising:
sensing a first voltage across the secondary switch and providing a first voltage signal representative of a maximum value of the first voltage, and wherein the ratio of the first voltage signal and the first voltage is a first ratio;
providing a second voltage signal representative of the output voltage, and wherein the ratio of the second voltage signal and the output voltage is a second ratio;
setting a control current based on the second voltage signal and the resistance of the external resistor;
in response to the ON control signal, charging a capacitor with the control current and a voltage across the capacitor is increased from the second voltage signal; and
providing the ON-time control signal when the voltage across the capacitor is increased to the first voltage signal.

16. The control method of claim 15, wherein the second ON-time is given by:

$$T_{ON\_ZVS} = \frac{C_S R_{TZVS}}{K} \frac{(V_{SRD} - KV_O)}{V_O}$$

wherein $C_s$ is the capacitance of the capacitor, $R_{TZVS}$ is the resistance of the external resistor, $V_{SRD}$ is the maximum value of the first voltage, Vo is the output voltage, and K is the ratio of the second ratio and the first ratio.

17. The control method of claim 14, further comprising:
providing an observation window based on the synchronous signal;
delaying a time delay after an instant of the second voltage across the primary switch crossing zero;
turning on the primary switch at the end point of the time delay if the end point of the time delay is within the observation window; and
turning on the primary switch at the end point of the observation window if the end point of the time delay is outside the observation window.

* * * * *